United States Patent
Kilty

(10) Patent No.: US 11,313,835 B2
(45) Date of Patent: Apr. 26, 2022

(54) PHOSPHORESCENT FERRO-MAGNETIC PARTICLE FORMULATION AND METHOD OF NON-DESTRUCTIVE TESTING THEREWITH

(71) Applicant: Illinois Tool Works Inc., Glenview, IL (US)

(72) Inventor: Shawn Michael Kilty, Davenport, IA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 898 days.

(21) Appl. No.: 16/084,085

(22) PCT Filed: Dec. 20, 2016

(86) PCT No.: PCT/US2016/067801
§ 371 (c)(1),
(2) Date: Sep. 11, 2018

(87) PCT Pub. No.: WO2017/155584
PCT Pub. Date: Sep. 14, 2017

(65) Prior Publication Data
US 2020/0292499 A1    Sep. 17, 2020

Related U.S. Application Data

(60) Provisional application No. 62/307,217, filed on Mar. 11, 2016.

(51) Int. Cl.
*G01N 21/64* (2006.01)
*G01N 27/82* (2006.01)
(Continued)

(52) U.S. Cl.
CPC ............. *G01N 27/82* (2013.01); *G01N 21/64* (2013.01); *G01N 21/88* (2013.01); *H01F 1/44* (2013.01)

(58) Field of Classification Search
CPC .......... G01J 3/44; G01J 3/4406; G01J 3/4424; G01N 27/82; G01N 21/64; G01N 21/88; H01F 1/44
See application file for complete search history.

(56) References Cited

U.S. PATENT DOCUMENTS 4,049,845 A    9/1977 Lozier et al.
4,219,587 A    8/1980 Oba et al.
(Continued)

FOREIGN PATENT DOCUMENTS

CN    101313316 A    11/2008
DE    102005047609 A1    4/2007
(Continued)

OTHER PUBLICATIONS

International Search Report dated Mar. 29, 2017 for International Application No. PCT/US2016/067801 filed Dec. 20, 2016.
(Continued)

*Primary Examiner* — Abdullahi Nur
(74) *Attorney, Agent, or Firm* — Blue Filament Law PLLC

(57) ABSTRACT

A dispersion of particles is provided that each contain at least one ferromagnetic domain and at least one phosphor domain having a stimulation wavelength, a glow persistence of at least 5 seconds and a visible wavelength emission. A polymeric resin that is transmissive of the stimulation wavelength and the visible wavelength emission coats the ferromagnetic and phosphor domains to define each particle size. A method of non-destructively inspecting a test article applies a dispersion of these particles to a surface of the test article. A magnetic field is then induced including the test article. The surface of the test article is exposed to incident energy adapted to stimulate phosphorescence of the dispersion of particles. With the incident energy exposure ceased, the position of the dispersion of particles on the surface of
(Continued)

the test article is imaged. An inspection system for non-destructively inspecting a test article is also provided.

20 Claims, 1 Drawing Sheet

(51) Int. Cl.
*G01N 21/88* (2006.01)
*H01F 1/44* (2006.01)

(56) References Cited

U.S. PATENT DOCUMENTS

| | | |
|---|---|---|
| 5,041,334 A | 8/1991 | Nakajima et al. |
| 5,424,006 A | 6/1995 | Murayama et al. |
| 8,648,136 B2 | 2/2014 | Kambe et al. |
| 2005/0019265 A1 | 1/2005 | Hammer et al. |
| 2010/0110544 A1* | 5/2010 | Gorodisher ............ G08B 5/004 359/515 |
| 2017/0036477 A1 | 2/2017 | Scholz et al. |

FOREIGN PATENT DOCUMENTS

| | | |
|---|---|---|
| EP | 0413854 A1 | 2/1991 |
| EP | 0375229 B1 | 8/1993 |
| JP | 51139387 A | 12/1976 |
| JP | H0253744 B2 | 11/1990 |
| JP | H10206391 A | 8/1998 |
| JP | 2000109902 A | 4/2000 |
| JP | 2002310993 A | 10/2002 |
| JP | 2003270212 A | 9/2005 |

OTHER PUBLICATIONS

Notice of Reasons for Rejection (translation) issued in JP 2018-547458, dated Oct. 13, 2020.

* cited by examiner

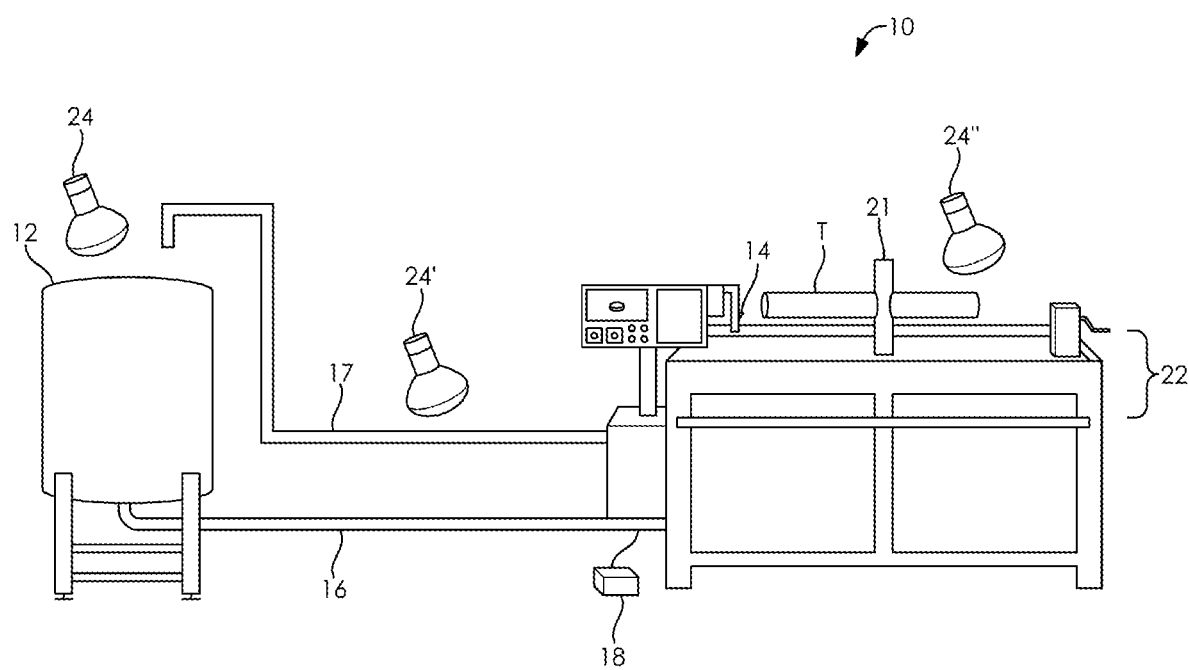

PHOSPHORESCENT FERRO-MAGNETIC PARTICLE FORMULATION AND METHOD OF NON-DESTRUCTIVE TESTING THEREWITH

FIELD OF THE INVENTION

The present invention in general relates to a phosphorescent composition for magnetic particle inspection and to a method of using the same.

BACKGROUND OF THE INVENTION

Non-destructive methods of testing structures of ferro-magnetic material (herein sometimes referred to as test pieces, or work pieces), through the use of fluorescent magnetic particles involves the inspection of the test piece in the substantial absence of visible light and under filtered ultraviolet light, usually referred to as Black Light. One of the advantages of using fluorescent magnetic particles, as compared with magnetic particles having only their natural visible coloration, is that there is a greatly increased contrast between the fluorescent magnetic particles and the background of the test piece, thereby giving a greatly increased sensitivity in the inspection of the surface for indications of surface discontinuities, flaws and the like. This makes it easier to detect potential flaws, and improves the overall inspection.

Fluorescent particles also have some disadvantages: in order to be effective, they must be used in a darkened room and using an ultraviolet light source. Once the light source is removed, the fluorescence is quenched in an amount of time of about $10^{-8}$ seconds rendering the particles no longer detectable. This rapid quench makes it difficult to inspect parts with complex geometries and the internal surfaces of hollow parts (pipes, casings, etc.), because the UV light often obstructs the view of the inspector. UV lights can also generate heat, making the inspection area uncomfortably hot. Additionally, the Stoke shift, the difference in excitation wavelength and emission wavelength is small, leading to a continued need to artificial UV light illumination. Still further, special protective eyewear is required suitable for protecting use eye's from UV light that lead to user discomfort.

While magnetic particle non-destructive testing remains a useful inspection technique, there exists a need for particles that allow such testing to be accomplished without or limited use of UV light sources. There also exists a need to visualize test articles over an extended period of time absent excitation wavelengths.

SUMMARY OF THE INVENTION

A dispersion of particles is provided that each contain at least one ferromagnetic domain and at least one phosphor domain having a stimulation wavelength, a glow persistence of at least 5 seconds and a visible wavelength emission. A polymeric resin that is transmissive of the stimulation wavelength and the visible wavelength emission coats the ferromagnetic and phosphor domains to define each particle size.

A method of non-destructively inspecting a test article is also provided that applies a dispersion of these particles to a surface of the test article. A magnetic field is then induced including the test article. The surface of the test article is exposed to incident energy adapted to stimulate phosphorescence of the dispersion of particles. With the incident energy exposure ceased, the position of the dispersion of particles on the surface of the test article is imaged.

An inspection system for non-destructively inspecting a test article includes a tank having a volume containing a dispersion of these particles. An applicator in fluid communication with the volume is provided for transferring the dispersion of particles from the tank onto a surface of the test article. An induction coil is provided for magnetizing the test article, along with an energy source for stimulating phosphorescence of the dispersion of particles. An inspection area remote from the energy source is provided such that the dispersion of particles is not stimulated by said energy source in the inspection area.

BRIEF DESCRIPTION OF THE DRAWINGS

FIG. 1 is a schematic of a magnetic particle inspection system according to the present invention.

DESCRIPTION OF THE INVENTION

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

A phosphorescent magnetic particle dispersion that has a glow persistence of from a few seconds to several minutes after incident stimulating light is removed. The inventive particle dispersion is applied to a test article in a manner like a conventional fluorescent particle dispersion. Through inclusion of a phosphor, a magnetic particle dispersion has a long persistent glow, as compared to fluorescent particles, and as a result, a stimulating light source would no longer need to be incident on the particles at the time of inspection. As a result, the inspection of complex geometries and internal surfaces of test articles is greatly facilitated. Furthermore, the collection of images of test articles is facilitated by imaging that is not in the presence of UV light. In some inventive embodiments, without the need for UV light exposure during the inspection process, the stimulating light source displaced from the inspection area and is alternatively located in an isolated area, relative to inspection such as in-line, or on a tank used to recirculate the magnetic particle bath.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

According to the present invention, a dispersion of particles is formed. These particles each include at least one paramagnetic or ferromagnetic domain. Each particle also includes at least phosphor domain. The phosphor domain is selected to have a glow persistence of at least 5 seconds and a visible wavelength emission. The stimulation wavelength is largely dictated by the energetics of the excited state. Wavelengths operative therein include blue visible light, violet visible light, ultraviolet (UV), X-rays, and electrons accelerated from an electron gun. The magnetic and phosphor domains are coated with a polymeric resin that is transmissive of the stimulation wavelength and the visible wavelength emission.

Polymer coated phosphors have been developed and used in color cathode ray tube (CRT) televisions and displays, as for example detailed in U.S. Pat. No. 4,049,845; it is appreciated that the inclusion of ferromagnetic domains would render the instant particles inoperative in the obsolete CRT displays. Similarly, the solvent exposure, inclusion of ferromagnetic domains, and mechanical conditions experienced by particles in non-destructive testing are not compatible with conventional polymer coated phosphors.

Ferromagnetic materials from which ferromagnetic domains are formed illustratively include γ-$Fe_2O_3$, magnetite ($Fe_3O_4$), and combinations thereof. It is appreciated that these materials include hydrates of the aforementioned. A particle must contain at least one ferromagnetic domain; it is appreciated that multiple domains can be present within a given particle. Typically, numbers of ferromagnetic domains per particle range from 1 to 1,000. It is appreciated that a more spherical particle is obtained when multiple such domains are present, thereby allowing a particle to roll more freely on a test article regardless of whether a magnetic field is being applied. Typically, the ferromagnetic domains are present from 40 to 80 total weight percent of a particle.

Phosphors are materials that have a triplet electronic state that is populated from the initial excited state, the decay from the triplet state back to the ground state (singlet) state is a spin forbidden radiative process. Owing to the triplet to singlet transition being forbidden, this process is slow on a spectroscopic timescale. Phosphors operative in the present invention have a glow after stimulating energy input is removed of at least 5 seconds. In some inventive embodiments, this is extended to 1 to 90 minutes.

Phosphor materials from which phosphor domains are formed include metal salts containing an activator dopant. Salt anions include an oxide, a nitride, an oxynitride, a sulfide, a selenide, a halide, a silicate, and a combination thereof. The metal of such a metal salt includes zinc; cadmium; manganese; aluminum; silicon; a rare earth metal, such as lanthanum, cerium, yttrium, strontium; or a combination thereof. The activator dopant includes copper; manganese; a rare earth metal such as europium, dysprosium, gadolinium, terbium; or a combination thereof with the proviso that the activator dopant is not the same as the metal, as in such a circumstance a trap state (triplet state) is not achieved. Specific phosphor domains operative herein illustratively include $SrAl_2O_4$, ZnS:Ag, ZnS:Cu.Au.Al, ZnS:Cu.Al, $Y_2O_2$S:Eu,$Y_2O_3$:Eu and combinations thereof. It is appreciated that more than one type of phosphor domain is present in a given particle to modulate a property that includes at least one of duration of phosphor glow, color, indicator of phosphor degradation, or phosphorescent intensity.

A particle must contain at least one phosphor domain; it is appreciated that multiple domains can be present within a given particle. Typically, numbers of phosphor domains per particle range from 1 to 1,000. It is appreciated that a higher net surface area of phosphor in a particle tends to enhance the amount of emissive glow from a particle. Typical loading of the phosphor is from 10 to 40 weight percent relative to the amount of ferromagnetic domains present.

In some inventive embodiments, conventional dye or subparticle fluorescent materials are also present to allow for conventional non-destructive imaging under fluorescence conditions and phosphorescence for inspection on crevices or internal areas of a test article. Typical loading of the fluorescent material is from 10 to 40 weight percent relative to the amount of ferromagnetic domains present.

A polymer is used in an inventive particle to serve several functions including coating the ferromagnetic domains and phosphor domains for protection thereof from the surrounding environment and server to bind the disparate domains together into a control size particle. A polymer must be transmissive to incident phosphor stimulating energy and also to emissive phosphor glow. Polymers operative herein can be either thermoplastics or thermoset resins. Polymers operative herein illustratively include: polyamides, melamines, latexes, acrylics, meth acrylics, polyvinyls, epoxies, block copolymers between any of the aforementioned units to form block copolymers, random copolymers between any of the aforementioned, random copolymers containing any of the aforementioned units, and mixtures of any of the aforementioned. To the extent that molecular is discussed herein with respect to a given polymer, molecular weight is number average molecular weight. It is appreciated that thermoset resins are cured to a terminal molecular weight to form a coating through conventional agents including free radical catalysts, UV light, acids, or other curatives conventional to the art.

In the method of making phosphorescent particles according to the present invention, a polymeric resinous coating is applied as a thermoplastic melt or thermoset monomer solution or pre-polymer to the ferromagnetic domains alone, phosphor domains alone, or a combination thereof. A thermoplastic resin is then cooled to form a mass containing the domains, while thermoset resins are cured. The mass can be formed by molding, extrusion, or other conventional technical to form subparticles prior to cooling or cure, else the mass is ground to a powder with a size of the final particles or to a smaller size. It is appreciated that a subparticle is overcoated with another layer of resin to form the final particle size. The overcoating resin in some inventive embodiments includes ferromagnetic domains alone, phosphor domains alone, or a combination thereof. It is appreciated that the overcoating resin can be the same the subparticle resin or vary in composition therefrom. As a result, particles that vary in composition as a function of depth with the particle as to the nature of the magnetic domain, nature of the phosphor, nature of the resin, or size of ferromagnetic or phosphor domains. In specific inventive embodiments, the overcoating resin contains only or a majority by domain weight of phosphor to limit optical screening of phosphor emissions from a particle core. In an exemplary inventive embodiment, a subparticle only containing magnetite is coated with polyamide subparticles ground to a desired size then overcoated with phosphor in polyamide. Particles sizes ranges from 1 to 200 microns. When the particles applied to a test article by a wet-method, particles with sizes of 1 to 60 microns are especially well suited, while in other embodiments from 1 to 30 microns. When the particles applied to a test article by a dry-method, particles with sizes of 40 to 200 microns are especially well suited, while in other embodiments from 40 to 120 microns.

In forming the coating, a solvent is used in some inventive embodiments for dissolving the thermoplastic resin that is relatively miscible with water and that can be removed from the coatings after application to the domains by suspending and agitating the coated particles or subparticles in water. This step simultaneously induces precipitation on the domains of the resin. Any residual traces of solvent in the coated particles are removed by washing, after which the coated particles are dried and ground. The removal of the residual solvent from the coated particles leaves the resin coating of the particles firmly adherent to the internal domains as a solvent-free resin that confers protection to the domains, especially the phosphors that can be damaged by oxidation.

A thermoset resin or monomer is mixed with domains and degassed concurrently or after a curative has been added. A cured thermoset mass is amenable to grinding to a desired particle or subparticle size.

A method of non-destructively inspecting a test article includes the application of a dispersion of inventive particles to a surface of the test article. The dispersion of particles is applied as a dry powder to the test article or as a spray with a carrier solvent. The dispersion of particles forms a suspension in the solvent. The particles whether as a suspension or dry powder are stored within the volume of a tank. The tank is in fluid communication with an applicator nozzle. Carrier solvents operative herein illustratively include water, mineral oils, paraffins and isoparaffins, naphthenics, and solutions thereof. A magnetic field is induced in the test article. Test articles illustratively include steel castings, extrusions, forgings, etc. The surface of the test article is exposed to incident energy to stimulate phosphorescence in the phosphor domains of the dispersion of particles to glow. Incident energy sources stimulate excitation of the phosphor to an excited state with an energy level greater than a triplet state to which the excited state decays. Incident energy sources include mercury lamps. UV light emitting diodes (LEDs), a laser, an electron beam, fluorescent and incandescent bulbs, and sunlight. In contrast to conventional fluorescent magnetic particles used in non-destructive testing, the incident energy source is either turned off or the incident energy is otherwise no longer stimulating phosphor excitation. The position of the dispersion of particles on the surface of the test article is then imaged based on the glow of the phosphor absent the incident energy exposure to non-destructively inspect the test article. It is appreciated that the induced magnetic field can either be on or off during non-destructive imaging of the test article. The imaging can be performed in darkness, low ambient light, or even visible light so long as the phosphor glow is imaged. It is appreciated that the imaging can be done with the naked human eye, a visible light camera, or a camera with optical filters to enhance the emissive phosphor glow. In a particular inventive embodiment, the incident energy source is visible light and said imaging is performed in darkness.

A system for non-destructive testing is shown generally at 10 in FIG. 1 and includes a tank 12 containing the dispersion of inventive particles. An applicator 14 for applying the particles to a test article, T includes piping 16 in fluid communication with the volume of the tank 12. Return piping 17 is present in some embodiments to recycle particles from an inspection area 22 that is depicted as a table in FIG. 1, to the tank 12. A pump 18 with a control switch 20 allow for the selective application of the dispersion of particles. An induction coil 21 for magnetizing the test article is provided and present within the inspection area 22. An incident energy source 24, 24', or 24" for stimulating phosphorescence of the dispersion of particles is provided. It is appreciated that one or more the sources 24, 24', or 24" is present. In instances when source 24' is present, then the piping 16 or 17 or both are transmissive of wavelengths emitted by the source 24'.

In instances when source 24" is not present or activated, the inspection area 22 is remote from the incident energy source 24 or 24' such that the dispersion of particles is not stimulated by said energy source 24 or 24' in the inspection area 22. The energy source 24, 24', or 24" in some inventive embodiments is a laser. In still other embodiments, the energy source 24 is the only one active and incident on the volume of the tank 12 so as to deliver glowing particles to the test article T.

The following examples serve as illustrations of how the present invention can be practiced. It will be understood, however, that the examples are by way of illustration only and are not by way of limitation upon the scope of my invention.

Example 1

Magnetic powder having an average domain size of 1-50 microns is mixed at 100 parts by weight with strontium oxide aluminate having an average domain size of 1-50 microns at 70 to 100 parts by weight as a dry powder mixture and slurried in 150 parts by weight water. Polyamide-6 is added at 10 parts by weight. A solvent of m-cresol is added at 40 parts by weight to dissolve the polyamide. With aqueous slurry is combined with the polyamide dissolved in m-cresol in a colloid mill and mixed for about 30 minutes. The contents of the colloid mill are drained into a filter press to obtain a filter cake. The filter cake is ball milled with water to an average particle size of 1-30 microns and sieved to remove particle greater than 50 microns, before oven drying. A dispersion of particles is obtained that are suitable for non-destructive testing imaging without incident UV light stimulation.

The invention claimed is:

1. A dispersion of particles, each of the particles comprising:
    at least one ferromagnetic domain, the at least one ferromagnetic domain having an average domain size of 1 to 50 microns;
    at least one phosphor domain having a stimulation wavelength, a glow persistence of at least 5 seconds, and a visible wavelength emission; and
    a polymeric resin coating that is transmissive of the stimulation wavelength and the visible wavelength emission, where said polymeric resin coating, said at least one ferromagnetic domain, and said at least one phosphor domain define a particle size, said polymeric resin coating firmly adherent to said at least one ferromagnetic domain and said at least one phosphor domain.

2. The dispersion of particles of claim 1 wherein said polymeric resin coating is one of: a polyamide, a melamine, a latex, an acrylic, a meth acrylic, a polyvinyl resin, or an epoxy.

3. The dispersion of particles of claim 1 wherein said polymeric resin coating is adapted to be UV cured.

4. The dispersion of particles of claim 1 wherein said at least one ferromagnetic domain comprises one of: $\gamma\text{-Fe}_2O_3$ or magnetite with the formula $Fe_3O_4$.

5. The dispersion of particles of claim 1 wherein said at least phosphor domain comprises a metal present as a salt with an anion and an activator dopant.

6. The dispersion of particles of claim 5 wherein said anion is an oxide, a nitride, an oxynitride, a sulfide, a selenide, a halide or a silicate of said metal.

7. The dispersion of particles of claim 5 wherein said metal is zinc, cadmium, manganese, aluminum, silicon, a rare earth metal, or a combination thereof.

8. The dispersion of particles of claim 5 wherein said activator dopant is copper, manganese, a rare earth, or a combination thereof with the proviso that said activator dopant is not the same as said metal.

9. The dispersion of particles of claim 1 wherein the particle size is from 1 to 200 microns.

10. The dispersion of particles of claim 1 wherein the particle size is from 40 to 120 microns.

11. The dispersion of particles of claim 1 further comprising a fluorescent material.

12. A method of non-destructively inspecting a test article comprising:
   applying the dispersion of particles of claim 1 to a surface of the test article;
   inducing a magnetic field around the test article;
   exposing the surface of the test article to incident energy adapted to stimulate phosphorescence of the dispersion of particles;
   then stopping the incident energy exposure to the surface; and
   then imaging the position of the dispersion of particles on the surface of the test article absent the incident energy exposure to non-destructively inspect the test article.

13. The method of claim 12 wherein said imaging is performed in darkness or under visible light.

14. The method of claim 12 wherein said incident energy source is ultraviolet light.

15. The method of claim 12 wherein said incident energy source is an electron beam source.

16. The method of claim 12 wherein said incident energy source is visible light and said imaging is performed in darkness.

17. The method of claim 12 wherein said applying is dry and absent a solvent, and the dispersion of particles has an average size of 40 to 120 microns.

18. The method of claim 12 wherein said applying is as a spray with a solvent, and the dispersion of particles has an average size of 1 to 60 microns.

19. An inspection system for non-destructively inspecting a test article comprising:
   a tank having a volume containing a dispersion of particles of claim 1;
   an applicator in fluid communication with the volume for transferring the dispersion of particles from said tank onto a surface of the test article;
   an induction coil for magnetizing the test article;
   an energy source for stimulating phosphorescence of the dispersion of particles; and
   an inspection area remote from said energy source such that the dispersion of particles is not stimulated by said energy source in the inspection area.

20. The inspection system of claim 19 wherein said energy source is a laser that is incident on the volume of said tank.

* * * * *